US010681521B1

(12) United States Patent
Govindassamy

(10) Patent No.: US 10,681,521 B1
(45) Date of Patent: Jun. 9, 2020

(54) METHOD AND APPARATUS FOR EMERGENCY ALERT IN NETWORKS

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

(*) Notice: Subject to any disclaimer, the term of this patent is extended or adjusted under 35 U.S.C. 154(b) by 0 days.

(21) Appl. No.: 15/968,925

(22) Filed: May 2, 2018

Related U.S. Application Data

(63) Continuation of application No. 15/964,361, filed on Apr. 27, 2018.

(51) Int. Cl.
*H04W 4/90* (2018.01)
*G08B 25/01* (2006.01)
*H04W 76/50* (2018.01)
*H04W 4/02* (2018.01)
*G08B 25/10* (2006.01)
*G08B 21/02* (2006.01)

(52) U.S. Cl.
CPC ............ *H04W 4/90* (2018.02); *G08B 25/016* (2013.01); *H04W 76/50* (2018.02); *G08B 21/02* (2013.01); *G08B 25/10* (2013.01); *H04W 4/023* (2013.01)

(58) Field of Classification Search
CPC ......... H04W 4/90; H04W 4/02; H04W 4/021; H04W 76/50; H04W 4/029; H04W 4/08; H04W 4/14; G08B 25/016; G08B 27/001; G08B 25/10; H04M 1/72536; H04M 1/72538; H04M 1/72541; G01S 19/17
See application file for complete search history.

(56) References Cited

U.S. PATENT DOCUMENTS

| | | | |
|---|---|---|---|
| 8,768,294 B2 | 7/2014 | Reitnour et al. | |
| 9,503,873 B1* | 11/2016 | Yadav | H04W 4/21 |
| 9,736,670 B2 | 8/2017 | Mehta et al. | |
| 9,799,010 B1 | 10/2017 | Leise | |
| 9,801,542 B2 | 10/2017 | Tran et al. | |
| 9,965,936 B1 | 5/2018 | Epps | |
| 10,019,881 B2 | 7/2018 | Chung et al. | |
| 2006/0143672 A1 | 6/2006 | Renkis | |
| 2009/0069642 A1 | 3/2009 | Gao et al. | |
| 2010/0246467 A1 | 9/2010 | Song et al. | |
| 2011/0212700 A1* | 9/2011 | Petite | H04W 4/12 455/404.1 |
| 2012/0254614 A1 | 10/2012 | Kimura et al. | |

(Continued)

*Primary Examiner* — Nam T Huynh
(74) *Attorney, Agent, or Firm* — Lerner, David, Littenberg, Krumholz & Mentlik, LLP

(57) ABSTRACT

Emergency notification systems, such as Commercial Mobile Alert System (CMAS) and AMBER alerts, as well as emergency help request systems, such as E911, are generally centralized systems. Often the first responders for emergencies may not be near the people who need assistance which may sometimes cause unacceptable delays in responding to emergencies. A method and apparatus are disclosed that offer a distributed and decentralized emergency notification and response system that informs and engages the people in the immediate vicinity of the person requiring assistance and enables dissemination of more detailed information beyond what may be provided by conventional emergency services systems.

32 Claims, 16 Drawing Sheets

(56) References Cited

U.S. PATENT DOCUMENTS

| | | |
|---|---|---|
| 2015/0164349 A1 | 6/2015 | Gopalakrishnan et al. |
| 2015/0208220 A1 | 7/2015 | Hulan |
| 2015/0281930 A1 | 10/2015 | Ben-Porath |
| 2015/0348389 A1 | 12/2015 | Jang et al. |
| 2016/0029197 A1 | 1/2016 | Gellens |
| 2016/0093197 A1 | 3/2016 | See et al. |
| 2017/0055139 A1 | 2/2017 | Sennett et al. |
| 2017/0156042 A1 | 6/2017 | Kwan et al. |
| 2017/0173262 A1 | 6/2017 | Veltz |
| 2017/0295481 A1 | 10/2017 | Pospiel |
| 2018/0054782 A1 | 2/2018 | Qi et al. |
| 2019/0134396 A1 | 5/2019 | Toth et al. |

* cited by examiner

FIG. 9

```xml
<?xml version="1.0"?>
<EARequest>
    <EARNumber = "R0001"></EARNUMBER>
    <VCDName>FirstName.LastName</VCDName>
    <VCDAGE>Age.25</VCDAGE>
    <VCDGender>Female</VCDFender>
    <LocationInfo>
        <Latitude>20deg45m0sN<\Latitude>
        <Longitude>55deg20m15sW<\Longitude>
    </LocationInfo>
    <VCDAlertType>Health</VCDAlertType>
    <Vital>
        <BP BPR="100_80"></BP>
        <Pulse PR="100"></Pulse>
        <History HP="yes"></History>
    </Vital>
    <VCDImage>
        <Image1 Name="Image1.ext">
            <EncodingType>base64binary<\EncodingType>
            <Image>ab98shkheroyigfjlasdfgasdfgasdfgasdf...<\Image>
        </Image1>
        <Image2 Name="Image2.ext">
            <EncodingType>base64binary<\EncodingType>
            <Image>1243434shkheroyigfjlasdfgasdfgasdfgasdf...<\Image>
        </Image2>
    </VCDImage>
    <VCDVideo>
        <Video1 Name="Video1.ext">
            <EncodingType>base64binary<\EncodingType>
            <Video length="01m:30s">
                ab9etyfghfghsgfhfgasdfgasdfgasdf...
            <\Video>
        </Video1>
        <Video2 Name="Video2.ext">
            <EncodingType>base64binary<\EncodingType>
            <Video length="03m:10s">
                ab9etyfghfghsgfhf23454556546asvfgh6rgasdfgasdfgasdf...
            <\Video>
        </Video1>
    </VCDVideo>
    <VCDAudio>
        <Audio1 Name="Audio1.ext">
            <EncodingType>base64binary<\EncodingType>
            <Audio>yfghfghsgfhfgasdfgasdfgasdf...<\Audio>
        </Audio1>
    </VCDAudio>
</EARequest>
```

FIG. 10

```xml
<?xml version="1.0"?>
<NEABAlert>
    <NEABNumber = "BC0001"></NEABNumber>
    <VCDName>FirstName.LastName</VCDName>
    <VCDAGE>Age.25</VCDAGE>
    <VCDGender>Female</VCDFender>
    <LocationInfo>
       StreetNo.10_StreetName.Street1_City.Irvine_State.CA_Zip.92123
    </LocationInfo>
    <VCDAlertType>Health</VCDAlertType>
    <Vital>
        <BP BPR="100_80"></BP>
        <Pulse PR="100"></Pulse>
        <History HP="yes"></History>
    </Vital>
    <VCDImage>
        <Image1 Name="Image1.ext">
            <EncodingType>base64binary<\EncodingType>
            <Image>ab98shkheroyiqfjlasdfgasdfgasdfgasdf...<\Image>
        </Image1>
        <Image2 Name="Image2.ext">
            <EncodingType>base64binary<\EncodingType>
            <Image>1243434shkheroyiqfjlasdfgasdfgasdfgasdf...<\Image>
        </Image2>
    </VCDImage>
    <VCDVideo>
        <Video1 Name="Video1.ext">
            <EncodingType>base64binary<\EncodingType>
            <Video length="01m:30s">
                ab9etyfghfghsgfhfgasdfgasdfgasdf...
            <\Video>
        </Video1>
        <Video2 Name="Video2.ext">
            <EncodingType>base64binary<\EncodingType>
            <Video length="03m:10s">
                ab9etyfghfghsgfhf23454556546asvfgh6rgasdfgasdfgasdf...
            <\Video>
        </Video1>
    </VCDVideo>
    <VCDAudio>
        <Audio1 Name="Audio1.ext">
            <EncodingType>base64binary<\EncodingType>
            <Audio>yfghfghsgfhfgasdfgasdfgasdf...<\Audio>
        </Audio1>
    </VCDAudio>
</NEABAlert>
```

METHOD AND APPARATUS FOR EMERGENCY ALERT IN NETWORKS

CROSS-REFERENCE TO RELATED APPLICATIONS

This application is a continuation of U.S. application Ser. No. 15/964,361, filed on Apr. 27, 2018, the disclosure of which is incorporated herein by reference, and contains subject matter related to, copending U.S. application Ser. No. 15/970,253, filed May 3, 2018 and copending U.S. application Ser. No. 15/970,286, filed May 3, 2018.

BACKGROUND

Three-digit emergency telephone numbers are used in countries around the world such as 911 in North America. The 911 and the Enhanced 911 (E911) are systems used in North America that link emergency callers with the appropriate public resources. Other easy dial codes, including the 112 number adopted by the European Union, have been deployed to provide free-of-charge emergency calls.

In North America, the system tries to automatically associate a location with the origin of the call. This location may be a physical address or other geographic reference information such as map coordinates. The caller's telephone number may be used in numerous manners to track a location that can be used to dispatch police, fire, emergency medical and other response resources. Automatic location of the emergency makes it faster to locate the required resources during fires, break-ins, kidnappings, and other events where communicating one's location is difficult or impossible.

In North America the incoming 911 call is normally answered at the Public Safety Answering Point (PSAP) of the governmental agency that has jurisdiction over the caller's location. When the 911 call arrives at the appropriate PSAP, it is answered by a specially trained official. In some jurisdictions the trained official is also the dispatcher of public safety response resources. When a landline call arrives at the PSAP, special computer software uses the telephone number to retrieve and display the location of the caller in near real-time upon arrival of the call.

There is a difference between the ways location is determined for different types of calls based upon the type of originating device or network. There are hardwired or wireline enhanced 911 calls which originate from a device connected to a known fixed point of connection to the public switched telephone network (PSTN). Wireless enhanced 911 are calls that originate for mobile devices such as cellular telephones. Voiceover Internet Protocol (VoIP) E911 pertains to communications originating from various commercial services provided by companies that send telephone calls across the commercial internet using specialized devices and software applications. For each of these categories different processes are required to obtain the required information to update the relevant database so that it may be used for 911 call routing and location determination.

In case of wireless calls, the billing address associated with a cell phone is not necessarily considered the location to which emergency responders should be sent, since the client device is portable. The U.S. Federal Communications Commission (FCC) has several requirements applicable to wireless or mobile telephones including the following: (1) operators using 'handset based' location determination technology must report handset (client device) location within 50 meters for 67% of calls, and within 150 meters for 90% of calls and (2) operators using 'network based' location determination technology must report client device location within 100 meters for 67% of calls and 300 meters for 90% of calls.

Next Generation 911 (NG911) is an initiative aimed at updating the 911 service infrastructure in the United States and Canada to improve public emergency communications services in a growingly wireless mobile society. In addition to calling 911 from a phone, it intends to enable the public to transmit text, images, video and data to the 911 center (PSAP). The initiative also envisions additional types of emergency communications and data transfer. This NG911 infrastructure is intended to replace the current services over time.

The First Responder Network Authority (FirstNet) of the United States is an independent authority within the National Telecommunications and Information Administration (NTIA). The purpose of FirstNet is to establish, operate, and maintain an interoperable public safety broadband network. When completed and operational, FirstNet may provide a unified communication capability across different emergency services organizations (fire, police, hospitals, etc.) and personnel. However, FirstNet may remain a centralized network much like its conventional previous generation communication networks.

A client device as defined in the present disclosure is a device that may access voice, video, text, instant messaging, internet and other services from a number of sources including wireless communication networks, Wi-Fi, Ethernet, etc. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network may be based on the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device and a network may also use future generation technologies for current and new services. A WWAN operator may deploy multiple Radio Access Technologies (RATs) such as 3GPP LTE, 3GPP Universal Mobile Telecommunications Service (UMTS), Global System for Mobile communication (GSM), Code Division Multiple Access (CDMA), Evolution Data Only/Evolution Data Optimized (EVDO), etc. Different client devices with different capabilities may connect to the WWAN using different suitable RATs for getting internet service. There may be one or more WWAN operators providing service in a particular geographic area. Each WWAN operator may use the same or different types of RATs. For providing end-to-end services, a WWAN many include, in addition to RATs, other network elements such as gateways and interfaces with other networks. Some client devices may have capability of supporting multiple Subscriber Identity Modules (SIMs) corresponding to different WWAN internet service providers. Some client devices with multiple SIMs may be able to get internet service from multiple WWANs simultaneously.

Typically, as shown in FIG. 1, a WWAN comprises one or more base stations which are also referred to as network elements. Other network elements may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the client device communicates with the BS in both the DL and UL directions. For instance, such communication is carried out in cellular communication systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred to herein as a "message."

A base station to which a client device may be downlink synchronized and/or communicating at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure may depend generally on whether a client device is engaged in an active communication with the wireless communication network. The measurements may include the Received Signal Strength Indicator (RRSI), Signal-to-Noise and Interference Ratio (SINR), the physical identities of one or more cells that may be visible or detectable by a client device, the difference between the timing of the current cell on which a client device may be camped and the timing of the neighbor cells. For example, in case of 3GPP LTE, the measurements may include Reference Signal Received Power (RSRP), Reference Signal Received Quality (RSRQ), Physical Cell Identity (PCI), etc.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive that information. Such information is herein referred to as "broadcast messages."

Typically in a wireless communication system a base station may group the system information and each group of system information may be transmitted as multiple broadcast messages and such broadcast messages are herein referred as "system parameter messages." The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as "System Information Block (SIB)." Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred to herein as "change-mark" is generally included in the SI messages. A client device may store the change-mark of the SIs it has decoded. If the new SI is transmitted by a cell, it may increment the change-mark to enable the client terminal to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIB s. This alternating sequence of sleep and wake-up in idle mode is referred to herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells. In connected mode, a client device may be actively engaged in communication with the network for data transfer in downlink, uplink, or both directions.

When a client device attempts to perform a network registration procedure to get service from a cell, it first decodes the system information broadcast in the cell. The client device may store such system information. The system information carries important information regarding the cell reselection criteria. Such information may include but not limited to the Tracking Area Identity (TAI), Public Land Mobile Network Identity (PLMN ID) which uniquely identifies a particular network operator, Closed Subscriber Group Identity (CSG ID), RAT type, neighbor cell frequencies, etc. A PLMN ID is a unique identifier for a particular WWAN operator. A Home PLMN is a PLMN ID that is identified as such in the SIM card of a client device. When a client device camps on a PLMN other than its Home PLMN, the client device may be considered as "roaming." This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the tracking area of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a TAI to identify the various groups of cells. This is shown in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred to herein as Tracking Area Update (TAU) procedure. With this method, a client device may perform TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred to herein as Client Device Identity (CDI).

As long as a client device is in the same registration area, the client device may not perform network registration procedure again except that a periodic network registration update procedure may need to be performed even if the client device continues to be stationary or move within the same registration area. If the client device moves to a cell which does not belong to the registration area in which the client device is registered, then the client device may perform network registration procedure to continue to access service from the network. Similarly, as long as a client device is in the same TAI, the client device may not perform TAU procedure again except that a periodic TAU procedure may need to be performed even if the client device continues to be stationary or move within the same TAI.

When a client device is in idle mode, the network may only be aware of the location of the client device at the tracking area or registration area level. In order for a network to page a client device, it may need to send the paging message in all cells belonging to the same tracking area or registration area. The instances for paging message transmission, known as paging occasions (POs), are usually derived based on a client device's unique identity and the paging cycle. The network may transmit a paging message addressed to a specific client device in its specific PO. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay. A single paging message received in a single PO may include multiple paging records to page multiple client devices. Different client devices may be identified within a paging message by using their respective unique identities in the paging records. For example, International Mobile Subscriber Identity (IMSI) may be used for the identity, or in case of 3GPP LTE wireless communication system, System Architecture Evolution (SAE)-Temporary Mobile Subscriber Identity (S-TMSI) may be used.

Internet service has become ubiquitous and the means by which it is obtained varies widely. For example, internet service may be provided through a Digital Subscriber Line (DSL), a Data Over Cable Service Interface Specification (DOCSIS) based internet service over cable television system (Cable Modem), a fiber optic network, a WWAN, a satellite communication network, etc. When the internet service provides high data transfer rates it is often referred to as broadband internet service. Broadband internet service is generally understood to be a service that is always on and offers data transfer rates on the order of mega-bits per second or higher for both downlink and uplink.

A client device may use internet service from one or more of the available internet service sources. A client device may access the internet service directly through one of the primary sources of internet service as mentioned earlier. Alternatively, a client device may access the internet service through a local network, which may perform distribution of the primary internet service to the users localized in a given area. Examples of such local networks include Local Area Network (LAN) using Ethernet, Wireless LAN (WLAN) commonly known as Wi-Fi, Bluetooth™, Zigbee or some other local area networking schemes. The wireless local networking schemes are collectively referred to herein as Short Range Wireless Link (SRWL). The wire-line local networking schemes, such as DSL, Cable Modem, Ethernet, etc. are collectively referred to herein as Short Range Cabled Link (SRCL). Both the SRWL and SRCL together are referred to as Short Range Link (SRL). When a client device is in proximity of a location where an SRL access is available, it may access the internet service using the SRL. FIG. 3 illustrates an example scenario of client devices accessing the internet service over a WLAN SRWL that is connected to a traditional wire-line internet service such as a DSL or a DOCSIS Cable Modem. The local area where WLAN service is available is often referred to as a Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL or DOCSIS Cable Modem through any of the standardized interfaces such as Universal Serial Bus (USB), Ethernet, or proprietary interfaces. In some cases, the DSL or DOCSIS Cable Modem and the Hotspot AP may be part of a single physical device. In such cases, the interface between the DSL or DOCSIS Cable Modem and AP may use Secure Digital Input Output (SDIO) or another suitable interface.

As the variety of client devices has increased and the demand for MB service has increased, a device known as a mobile Hotspot is commonly used. A mobile Hotspot device includes both a modem for WWAN and a WLAN AP (Hotspot AP) to distribute the internet service to local client devices. FIG. 4 illustrates the block diagram of an example mobile Hotspot device. As shown in FIG. 4, for the chosen example, the WWAN modem and the Hotspot AP may be connected to each other via one of the standard interfaces used in the industry such as USB, SDIO, or proprietary interfaces. In another mobile Hotspot example, the WWAN modem and the WLAN AP may be an Integrated Circuit (IC) as shown in FIG. 5.

Some client devices have capability to connect with number of different sources of internet service. For example, a client device may have a WWAN modem that may be used to get mobile internet service directly from the mobile broadband network as illustrated in FIG. 6. The flow of data as shown in FIG. 6 is from the mobile broadband modem to the application processor which processes the download and upload application data and interacts with the user via the display and other elements of the user interface such as touch-screen, camera, microphone, speaker, vibrator, etc. The client device may also have a WLAN modem to access internet service over a Hotspot AP. When it is near a Hotspot AP, it may use internet service from a Hotspot as illustrated in FIG. 3. In that case the flow of internet data is as shown in FIG. 7 from the internet to the DSL or Cable Modem to the Hotspot AP and then to the WLAN modem and on to the application processor which processes the download and upload application data and interacts with the user via the display and other elements of the user interface such as touch-screen, camera, microphone, speaker, vibrator, etc. in the client device.

When a client device is connected to an SRL such as the WLAN for internet service, it may continue to maintain its link with the WWAN for services other than internet service. For example, a voice call or a video call to or from the phone number associated with the client device may be enabled through the WWAN while the internet service may be accessed through WLAN. The maintenance of the link with the WWAN may not necessarily require an active connection (a call or an internet service), but it may involve a number of procedures that a client device may need to perform. A client device may need to continue to receive paging messages from the WWAN in order to receive any incoming voice or video calls. A client device may need to perform measurements on SBS and NBSs as well as decode the SI from the SBS and some of the NBSs. A client device may need to perform TAU procedure with the WWAN whenever it reselects to a neighbor cell with a TAI different from a TAI of its current serving cell. A client device may need to perform registration procedure with the WWAN when it reselects to a cell in a different registration area or when a periodic registration update is required. Collectively, all the procedures performed by a client device in idle mode with WWAN are referred to as idle Radio Resource Management (RRM) procedures. In FIG. 7, the link between the WWAN modem of a client device and the WWAN is maintained for the purposes mentioned above, even when the client device is getting internet service from the WLAN.

Many client devices have capability for location determination. Similarly network elements such as base stations also have location determination capability. The location determination may be performed using different techniques including but not limited to the Global Navigation Satellite Systems (GNSS) such the U.S. Global Positioning System (GPS), Russian GLObal NAvigation Satellite System (GLONASS), European Galileo positioning system, Chinese Beidou Navigation Satellite System (BDS), and others. Other location determination methods may include Observed Time Difference Of Arrival (OTDOA), Uplink Time Difference of Arrival (UTDOA), Enhanced Cell ID (E-CID), etc. The client devices and network elements may support multiple techniques for location determination.

A capability for a client device or for a network element may include but is not limited to the different RATs (2G, 3G, 4G, etc.) supported, the frequency bands supported in each RAT, the supported SRCL and SRWL along with supported frequency bands, supported location determination techniques, supported connection pooling and distribution capability, supported data rates, supported Quality-of-Service (QoS), voice call, video call, available storage, etc.

The conventional emergency services systems, such as E911, are generally centralized systems. Often the first responders for emergencies may not be near the people who need assistance and which may sometimes cause unacceptable delays in responding to emergencies. Further, in case of an emergency the user of the client device may not be in a situation to be able to communicate with the emergency services operator. For example, in case of medical emergency the user may be physically unable to take any action except perhaps to press a single button or enter a few keystrokes. In another example, in case of kidnapping, theft, robbery, terrorism, etc., the user's safety may be in jeopardy and it may not be advisable for the user to explicitly initiate communication with emergency services.

SUMMARY

A method and apparatus are disclosed that enables a user, with very limited action, to discreetly initiate communication with and request assistance from emergency services operators as well as other users nearby with their own client devices.

In accordance with an aspect of the present disclosure, a method for emergency alerting at an Emergency Alert Destination (EAD) as a network element of a wireless communication system may include controlling, by a processing device at the EAD, receiving, from a Victim Client Device (VCD) of the wireless communication system, an Emergency Alert (EA) Request message including predetermined emergency information transmitted based upon initiation of an EA procedure at the VCD; and based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD.

In one alternative, the method may include controlling, by the processing device, receiving, from the VCD, at least one of at least one image or at least one audio data associated with the EA procedure being performed at the VCD.

In one alternative, the at least one image may include a plurality of images captured using a front and rear facing camera at the client device, or at least one second image from a memory of the VCD.

In one alternative, the predetermined emergency information may include at least one of a measurement at the VCD from at least one available vitals monitor, a predetermined second prior taken vitals measurement or predetermined health information.

In one alternative, the method may include controlling, by the processing device, determining the geographic proximity based on at least one of location of the VCD, location of a base station on which the VCD is camped or other predetermined criteria.

In one alternative, the method may include controlling, by the processing device, transmitting the NEAB message to each base station having a same Tracking Area Identity (TAI) as a TAI of a given base station on which the VCD is camped.

In one alternative, the method may include controlling, by the processing device, requesting the each base station having the same TAI to broadcast the NEAB message in a respective coverage area.

In one alternative, the method may include controlling, by the processing device, determining a periodicity for the transmitting of the NEAB message and transmitting periodicity information indicating the periodicity with the NEAB message.

In one alternative, the method may include controlling, by the processing device, when the EAD is a base station, receiving, from a second EAD of the wireless communication system, a second NEAB message with periodicity information indicating periodicity of transmission of the second NEAB message, in which the second NEAB message includes at least one of location, identification information or predetermined other information of a second VCD indicated by the second NEAB message as transmitting a second EA Request message including predetermined emergency information received by the second EAD; and based on the second NEAB message with the periodicity information, updating system information (SI) to indicate presence and periodicity of given second NEAB messages.

In one alternative, the method may include controlling, by the processing device, providing an option for a third client device to register with the EAD for receiving a given NEAB message therefrom.

In one alternative, the method may include controlling, by the processing device, transmitting a multicast paging message only to a given third client device registered with EAD to receive a given NEAB message from the EAD, to notify of broadcast of the given NEAB message.

In one alternative, the NEAB message may include at least one of an image from the VCD or vitals information for a user of the VCD.

In one alternative, the NEAB message may have a predetermined format adapted for inclusion therein of additional different types of information.

In one alternative, the method may include controlling, by the processing device, transmitting the NEAB message to a predetermined nearby emergency service resource, In one alternative, the predetermined nearby emergency service resource may be registered with the EAD to receive a given NEAB message.

In one alternative, the method may include controlling, by the processing device, receiving a response message from the at least one second client device as a helping client device (HCD) or a nearby client device (NCD) indicating the at least one second client device volunteered to assist a user of the VCD.

In one alternative, the method may include controlling, by the processing device, transmitting an EA response message to the VCD notifying that the at least one second client device as a helping client device (HCD) or a nearby client device (NCD) volunteered to assist a user of the VCD.

In one alternative, the method may include controlling, by the processing device, prioritizing providing an updated location of the VCD, when the location of the VCD is changed, to a helping client device (HCD) or a nearby client device (NCD) of the VCD which volunteered to assist a user of the VCD.

In one alternative, the method may include controlling, by the processing device, transmitting a periodic update of a location and at least other emergency related information of the VCD to at least one of a helping client device (HCD) or a nearby client device (NCD) of the VCD which volunteered to assist a user of the VCD.

In one alternative, the periodic update may be transmitted to the at least one of the HCD or the NCD when the at least one of the HCD or the NCD has not responded to a given EA Request message from the VCD.

In one alternative, the method may include when a Preferred Group helping client device (PGHCD) of given client devices each being a helping client device (HCD) for the VCD is registered with the EAD by the VCD, controlling, by the processing device, based on a second EA Request message transmitted from the VCD, transmitting an alert notification to the PGHCD.

In one alternative, the second EA Request may be other than the EA Request message, wherein the EA Request message is transmitted to a given nearby client device (NCD) of the VCD using broadcast or multicast and over a Short Range Wireless Link (SRWL).

In one alternative, the method may include controlling, by the processing device, receiving a given EA request message from the VCD specifying at least one notification preference including (i) notification only to a Preferred Group HCD (PGHCD) formed by the VCD and registered to the EAD, in which each given client device in the PGHCD is a given Helping Client Device (HCD) for the VCD, ii) notification to the PGHCD by general broadcast or multicast, iii) notification by general broadcast or multicast only, iv) notification only to at least one nearby client device (NCD) via a Short Range Wireless Link (SRWL) with which the at least one NCD is connected with the VCD, and v) notification by i), ii), iii) and iv).

In one alternative, the method may include controlling, by the processing device, until the VCD user gets assistance or is out of danger or emergency, periodically transmitting the EA Request message of the VCD to at least one of a nearby client device (NCD), a helping client device (HCD) or a potential HCD for the VCD.

In one alternative, the method may include, when the EAD is a wireless network control element, controlling, by the processing device, treating the EA Request message as a predetermined emergency call for priority in the wireless communication system for granting network access to the VCD.

In one alternative, the method may include controlling, by the processing device, when a condition of out of danger or emergency exists at the VCD, receiving an EA Stop message from the VCD or from a given nearby client device (NCD) or a given helping client device (HCD) who provided assistance to a user of the VCD, to notify the EAD of the condition.

In one alternative, the method may include, when the EA Stop message is received, controlling, by the processing device, notifying each given NCD and given HCD that the VCD is out of danger or emergency by transmitting the EA Stop message thereto.

In one alternative, the method may include, when the EA Stop message is received and the EA Stop message is from the given HCD, controlling, by the processing device, checking authenticity of the given HCD.

In one alternative, the method may include, when the EA Stop message is received, controlling, by the processing device, transmitting an EA closure notification to the VCD requesting confirmation of the EA Stop message.

In one alternative, the EA request message maybe transmitted by at least one of broadcasting, multicasting or peer-to-peer.

In accordance with an aspect of the present disclosure, an apparatus for emergency alerting at an Emergency Alert Destination (EAD) as a network element of a wireless communication system may include circuitry configured to control, receiving, from a Victim Client Device (VCD) of the wireless communication system, an Emergency Alert (EA) Request message including predetermined emergency information transmitted based upon initiation of an EA procedure at the VCD; and based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD.

In accordance with an aspect of the present disclosure, a wireless communication device may include a receiver to receive a wireless communication; and a processing device configured for emergency alerting at the wireless communication device as an Emergency Alert Destination (EAD) and which is a network element of a wireless communication system, wherein the processing device is configured to control at the EAD: receiving, from a Victim Client Device (VCD) of the wireless communication system, an Emergency Alert (EA) Request message including predetermined emergency information transmitted based upon initiation of an EA procedure at the VCD; and based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD.

BRIEF DESCRIPTION OF THE DRAWINGS

FIG. 9 illustrates an example of an EA Request message according to the aspects of the present disclosure.

FIG. 10 illustrates an example of a NEAB message according to the aspects of the present disclosure.

DETAILED DESCRIPTION

Figure 1:
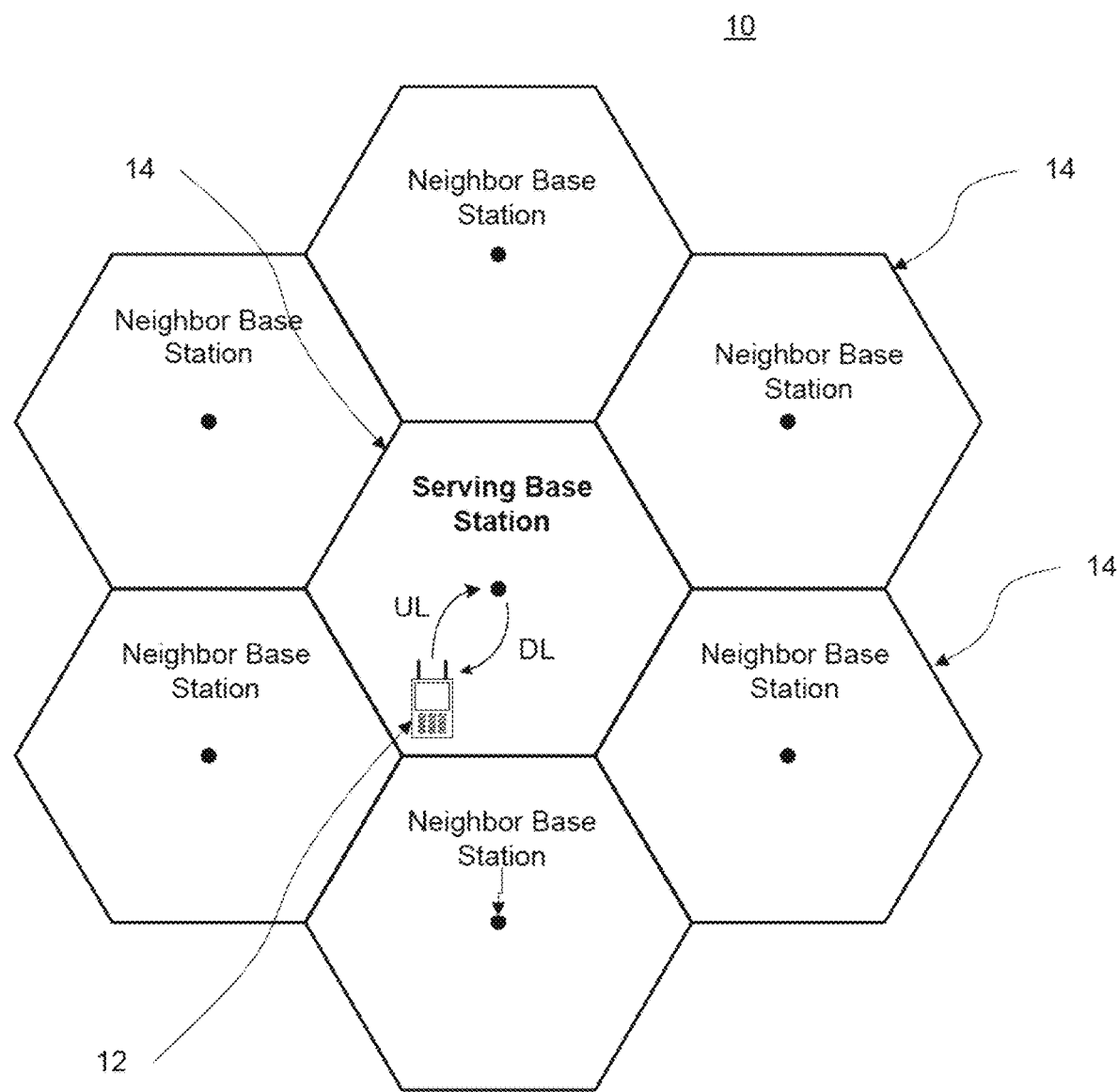
FIG. 1 illustrates a conventional mobile wireless communication system.
Figure 2:
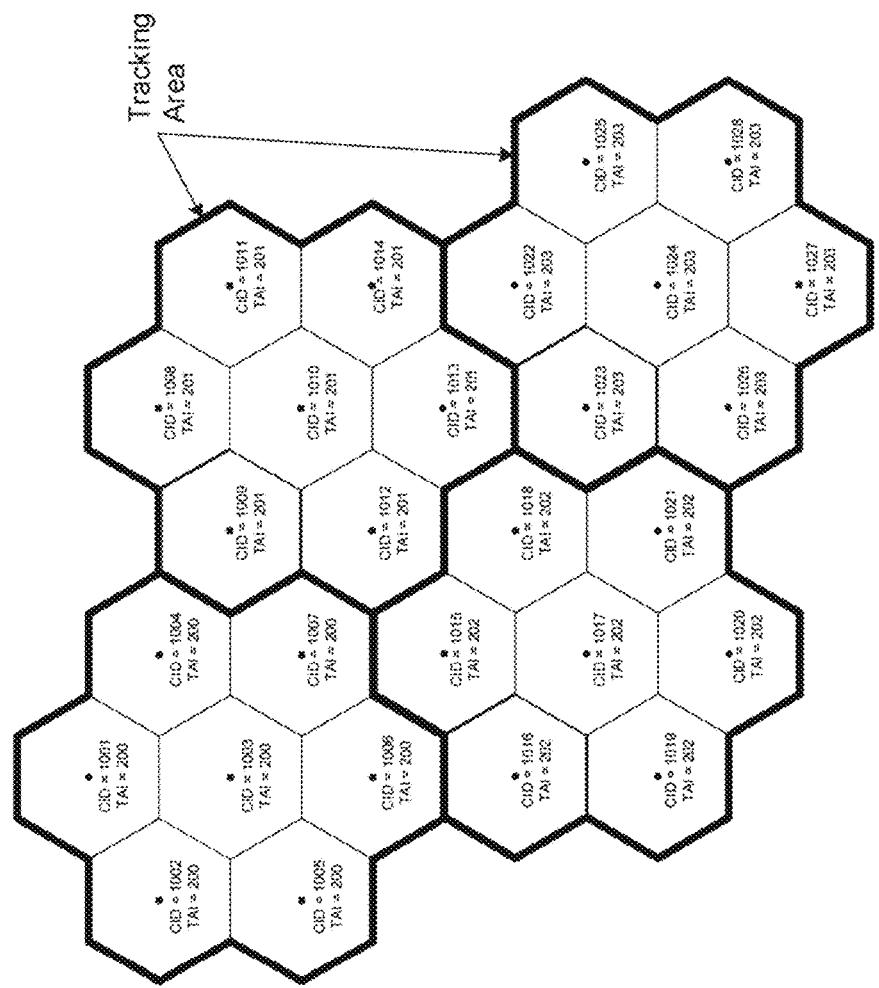
FIG. 2 illustrates the grouping of cells into tracking areas in a wireless communication system.
Figure 3:
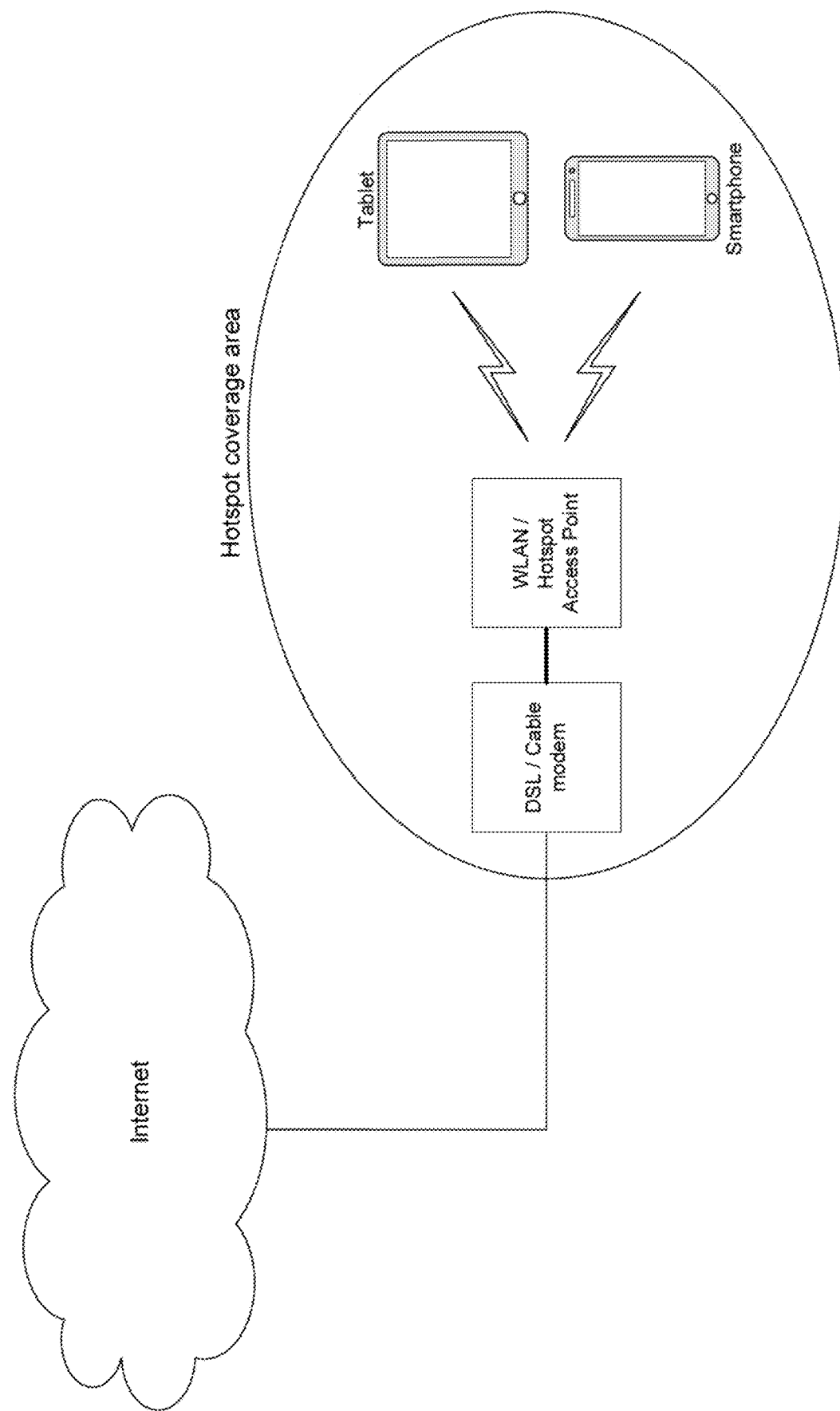
FIG. 3 illustrates an example scenario of internet access using Wireless Local Area Network (WLAN) over a traditional wire-line internet service.
Figure 4:
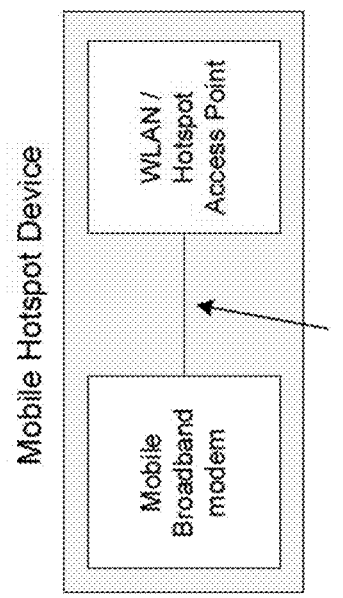
FIG. 4 illustrates a high-level block diagram of an example mobile Hotspot device.
Figure 5:
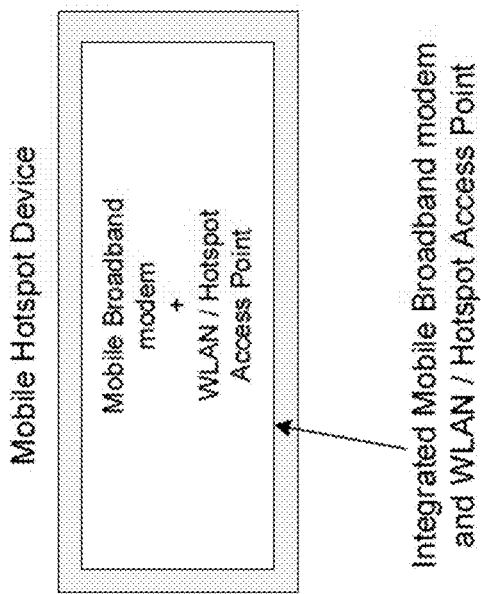
FIG. 5 illustrates a high-level block diagram of an example mobile Hotspot device with an integrated mobile broadband modem and WLAN Access Point (AP).
Figure 6:
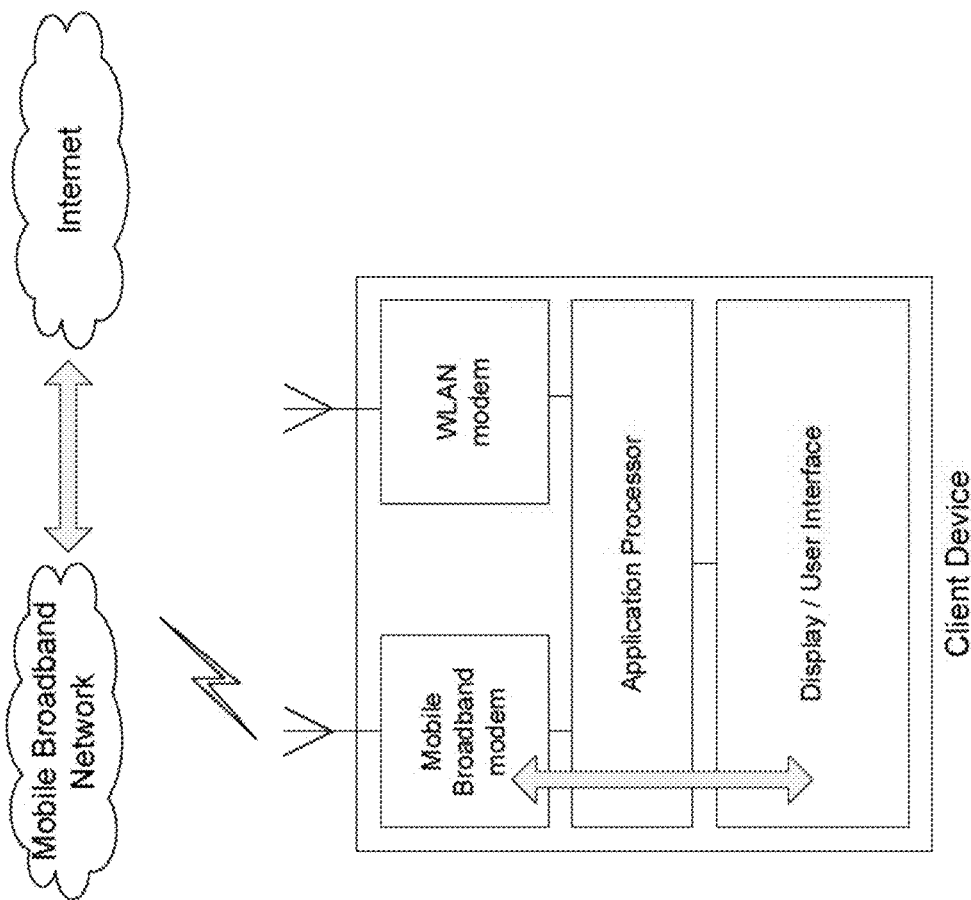
FIG. 6 illustrates a use case and data flow of internet access over a mobile broadband network by a client device.

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the appended drawings, specific terminology will be used for the sake of clarity. However, the present disclosure is not intended to be limited to the specific terms used.

Although aspects of the present disclosure are illustrated using a particular type of client devices and communication networks, the present disclosure is applicable to any type of client devices and communications networks some of which are mentioned in an earlier section in the present disclosure.

According to an aspect of the present disclosure, a client device may have a trigger for the client device to initiate an Emergency Alert (EA) procedure. According to an aspect of the present disclosure, the trigger for the EA may take the form of, for example, a dedicated hardware button, a soft key/button on a client device user interface menu, or a voice activated command based on voice recognition system. In another example, EA procedure may be triggered by simultaneously pressing two or more buttons which may normally have different functions when pressed individually. For example, the volume up and down buttons may individually control the volume of sound on a phone but pressed together could be used as a trigger for EA procedure.

Once the EA trigger is received by the EA Management Unit (EAMU) in the client device, according to an aspect of the present disclosure, it may start the EA procedure by sending the EA Request message which may include information that is typically provided in conventional emergency calls and it may also include additional information as described below. The client device sending the EA Request message is referred to herein as the Victim Client Device (VCD). According to an aspect of the present disclosure, the EA Request message may be sent to one or more EA Destinations (EAD) which may include a network element, other client devices, or an Emergency Services Web Server (ESWS). Some form of indication may also be sent to the conventional emergency services operators as well. For example, a 911 call may be initiated as part of the EA procedure if configured to do so.

In case of conventional emergency call systems, such as E911, a wireless or mobile client device may send its location and some additional identifying information that may be required by the emergency services operators and government authorities. However, the type of information that may be sent may be limited.

Most modern client devices have built-in cameras and microphones. According to an aspect of the present disclosure, once the EAMU in the VCD has initiated EA procedure, the EAMU in the VCD may autonomously start taking pictures and send the pictures to the EADs. According to an aspect of the present disclosure, the EAMU in the VCD may autonomously start taking pictures from both the front and rear facing cameras and send the pictures to the EADs. According to an aspect of the present disclosure, once the EAMU in the VCD has initiated EA procedure, the EAMU in the VCD may autonomously start recording voices and other sounds and send them to the EADs. According to an aspect of the present disclosure, once the EAMU in the VCD has initiated EA procedure, the EAMU in the VCD may autonomously start taking pictures and recording voices and other sounds, i.e., video, and send them to the EADs. According to an aspect of the present disclosure, client devices that do not have cameras may use pre-stored images (e.g., picture of the user) when sending the EA Request message. According to an aspect of the present disclosure, the EA Request message from the VCD may include a pre-stored image along with the currently taken images.

Many modern client devices such as smartphones, smart watches, and fitness trackers have built-in heart rate monitor and other vitals monitors (body temperature, respiration rate, blood pressure, blood glucose levels). According to an aspect of the present disclosure, once the EAMU in the VCD has initiated EA procedure, the EAMU in the VCD may autonomously start taking measurements from one or more of the available vitals monitors and send the measurements to the EADs. According to an aspect of the present disclosure, the EA Request message may include previously taken vitals measurements or other known health information.

One of the EADs to which the EA Request message is sent may be a network element such as a base station or an EA Server of a wireless network such as WWAN. According to an aspect of the present disclosure, the network element may prepare a Neighbor EA Broadcast (NEAB) message which may include the location and other identifying information of the VCD. According to an aspect of the present disclosure, the network element may send the NEAB message to the client devices that may be in geographic proximity of the VCD. According to an aspect of the present disclosure, the network element may determine the geographic proximity based on the location of the VCD and/or the base station on which the VCD may be camped. According to an aspect of the present disclosure, the network element may send the NEAB message to all the base stations with the same TAI as the TAI of the base station on which the VCD may be camped. According to an aspect of the present disclosure, the network element may request those base stations to broadcast the NEAB message in their respective coverage areas. According to an aspect of the present disclosure, the network element may use other criteria to determine the proximity of nearby client devices. For example, it may use a certain distance from the location of the VCD as a criteria for selecting base stations to which the NEAB should be sent. According to an aspect of the present disclosure, the network element may determine the periodicity of the NEAB message transmission and it may communicate this information along with the actual NEAB message. According to an aspect of the present disclosure, the base stations receiving the NEAB message and periodicity may update their SI to indicate the presence and periodicity of the NEAB messages.

According to an aspect of the present disclosure, some client devices may be configured by their users to receive NEAB message and inform the user via a user interface such as a display or a speaker or both about the NEAB message. Client devices that are not configured by their users to receive the NEAB message may ignore the presence of the NEAB message in the messages broadcast by a base station.

According to an aspect of the present disclosure, the network element may provide an option for a client device to register with the network element for receiving NEAB messages. According to an aspect of the present disclosure, such registration may be part of client device's normal network registration procedure. According to an aspect of the present disclosure, when client devices have registered with the network element for receiving NEAB message, the network element may send a multicast paging message, only to those registered client devices, to notify the broadcast of NEAB message. According to an aspect of the present disclosure, a client device registered for NEAB message may monitor the paging messages and determine to start decoding the NEAB message after receiving indication for its broadcast in the multicast paging message. According to an aspect of the present disclosure, the NEAB message broadcast by the one or more base stations may include, for example, the location, one or more images from the VCD, and any other additional information such as the vitals. According to an aspect of the present disclosure, the NEAB message may use a flexible format such as eXtensible Markup Language (XML) format to enable inclusion of different and new types of information.

According to an aspect of the present disclosure, the network element may additionally send the NEAB message to a nearby emergency services resources such as a police stations, security service centers, individual police officers or patrol cars, ambulances, hospitals, individual doctors, or any other registered first responders.

According to an aspect of the present disclosure, the emergency services center (such as PSAP) and its personnel may have pre-registered with one or more of the EADs such as the network element for receiving such NEAB messages. The emergency services personnel may keep their location updated for the network element to track their location and to identify the nearest available emergency services personnel to whom the network may send the EA Request message.

The reception of the NEAB message containing the EA Request by users of the one or more nearby client devices and the emergency services personnel may enable them to provide assistance to the user of the VCD in a timely manner compared to the traditional conventional method.

According to an aspect of the present disclosure, the VCD may perform the EA procedure with or without creating any local alert such as light, flash, sound, or vibration to maintain the safety of the user of the VCD. In case of health related EA Request message, the VCD may create local alerts such as light, sound, and/or vibration to get attention of nearby people. In case of safety related EA Request message, the VCD may not create local alerts such as light, sound, or vibration to avoid getting attention of the perpetrators or animals posing a threat. The above two types of triggering of EA procedure are referred to herein as (i) normal mode EA procedure (e.g., to be used in health emergency scenario) and (ii) quiet mode EA procedure (e.g., to be used in kidnapping scenario). According to an aspect of the present disclosure, the default mode of EA procedure to be used when a user initiates EA trigger may be configurable.

According to an aspect of the present disclosure, the user may modify the default mode of EA trigger after the EA procedure is initiated. For example, the user may set the default mode to be quiet mode and depending on the prevailing surrounding conditions may be change to the normal mode for the EA procedure. According to an aspect of the present disclosure, the various settings of the quite mode and normal mode of EA procedure may be configurable. For example, in some emergency scenarios, light or flash may not be turned on but sound or vibration may be acceptable whereas in other scenarios it may be acceptable to turn on light or flash but not acceptable to turn on sound and/or vibration. According to an aspect of the present disclosure, the level of the sound, light, flash, vibration may be adjustable such that it may catch the attention of people who may potentially provide assistance while avoiding attention of perpetrators. According to an aspect of the present disclosure, the level of the sound, light, flash, vibration may have default values and they may be different for the normal mode and quiet mode. For example, the sound level may be loudest for normal mode while may be low or muted for quiet mode.

Figure 7:
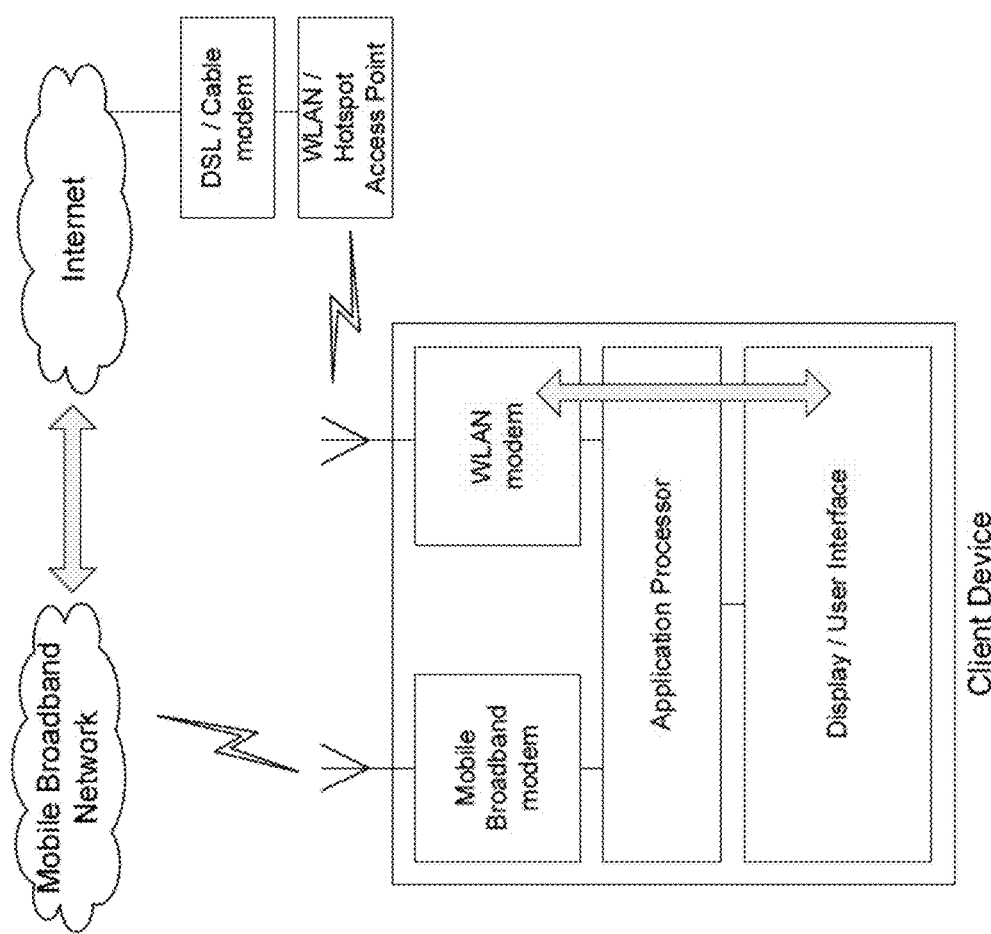
FIG. 7 illustrates a use case and data flow of internet access over a WLAN network by a client device.

A VCD may be simultaneously connected to a WWAN as well as with an SRWL as illustrated in FIG. 7. There may be a number of client devices connected to the same SRWL. According to an aspect of the present disclosure, the VCD may also send the EA Request message to any nearby client devices with which the VCD may be connected through the SRWL. There may be two types of neighbor client devices (NCD) as follows. The VCD may be connected and authenticated with some of the NCDs on the SRWL while with some other client devices on the SRWL it may not be connected or authenticated. According to an aspect of the present disclosure, for the NCDs on the SRWL with which the VCD is connected and authenticated, the VCD may send the EA Request message with all the relevant information such as the location, images, sounds, vitals, etc. This EA Request message is similar to the one sent to the network element. Since SRWLs generally serve client devices within a short range, sending of the EA Request message to the client devices on the SRWL that may be already in the vicinity of the user may reduce delay in providing assistance to the victim.

According to an aspect of the present disclosure, for the NCDs on the SRWL with which the VCD is not connected or authenticated, the VCD may send a request to connect with the NCD on the SRWL with indication of emergency. According to an aspect of the present disclosure, the NCD may provide a temporary connection with the VCD, without any authentication, to only send the EA Request message with the associated information.

According to an aspect of the present disclosure, the VCD may continue to scan all the available NCDs on the SRWL and may get connected to one NCD at a time and send the EA Request message. According to an aspect of the present disclosure, the VCD may continue to perform this procedure in a periodic manner until the VCD user terminates the EA procedures and informs all the NCDs that the victim user is out of emergency or danger. According to an aspect of the present disclosure, the periodicity to scan for available NCDs may be made configurable, for example scan once every five seconds.

According to an aspect of the present disclosure, the VCD may take the role of a master controller in an SRWL, for example the role of an AP in case of Wi-Fi SRWL, and may broadcast the EA Request message so that all the NCDs in the SRWL may receive the message and react to it. The NCD on the SRWL that may receive the EA Request message may or may not respond to the message from the VCD acting as the master controller.

The NCD may only perform NCD user alert on the received EA request message content from VCD Depending on the particular technology being used for the SRWL, such as Wi-Fi, Bluetooth, etc., there may or may not be provision for changing the role of the master controller. Depending on the requirement of each SRWL appropriate updates may be required in the respective SRWL technology.

According to an aspect of the present disclosure, if the VCD has more than one SRWL capability (Wi-Fi, Bluetooth, Zigbee, etc.), it may scan all the NCDs in all of its SWRL connectivity and may send the EA Request message to all the NCDs in each of the SRWL.

According to an aspect of the present disclosure, if the VCD is connected to internet, it may upload some or all of the contents of the EA Request message to a web server referred to herein as Emergency Services Web Server (ESWS). According to an aspect of the present disclosure, the ESWS may be cloud server such that it may be accessible from any part of the world with low latency. According to an aspect of the present disclosure, the ESWS may be a private or a public server that may be open to all the users. According to an aspect of the present disclosure, a client device may register with the ESWS.

According to an aspect of the present disclosure, a client device may be pre-configured with ESWS connection details such as Internet Protocol (IP) address, port number, file format etc. such that a VCD may be able to connect with the ESWS with low latency and upload the EA Request message content in the format specified and agreed with the ESWS.

According to an aspect of the present disclosure, upon receipt of a new EA Request message from a client device, the ESWS may alert nearby registered emergency services centers depending on the VCD location details. According to an aspect of the present disclosure, the details of the emergency services centers and personnel in the ESWS may be preconfigured to avoid delays when responding to the actual EA Request messages.

According to an aspect of the present disclosure, the ESWS may keep the emergency services center and personnel information updated with their most recent location which may help the ESWS to identify the nearest available emergency services resources and alert them.

According to an aspect of the present disclosure, normal users may voluntarily register their client devices with location and connectivity details (example IP Address, Transmission Control Protocol (TCP) port number, etc.) with ESWS so that the volunteer users in the vicinity of the VCD may take appropriate action to assist the VCD user. The normal volunteer users may include users of stationary client devices such as a home/office desktop/laptop computer, TV, radio, etc. through which the alert may be given to the user of those client devices by the ESWS. The normal volunteer users may have mobile client devices which may keep updating their most recent location to the ESWS which in turn may pick the volunteer client device that may be in the vicinity of the VCD user.

A volunteer client device or any other client device whose user decides to help the VCD user is referred to herein as Helping Client Device (HCD). According to an aspect of the present disclosure, the NCDs or the HCDs may respond to the network element or the ESWS that it is going to help the VCD user. According to an aspect of the present disclosure, the network element or the ESWS may send EA Response message notifying the VCD that one or more NCDs or HCDs have decided to help the VCD user. According to an aspect of the present disclosure, upon receipt of the EA Response message, the VCD may provide an active alert (e.g., sound and display message) or a silent alert to the user depending on the indication originally received for triggering the EA Request message. According to an aspect of the present disclosure, upon receiving the notification of the EA Response message, the user of the VCD may determine whether to open the detailed EA Response message about the NCDs or HCDs that may provide assistance. The user of the VCD may make the determination based on the safety situation at the time of the arrival of the EA Response message.

According to an aspect of the present disclosure, the network element, SRWL or the ESWS may prioritize providing the updated location of the VCD (if there is a change in its location) to the NCDs and HCDs that volunteered to assist the VCD user. According to an aspect of the present disclosure, the network element (WWAN), SRWL or the ESWS may send periodic updates of the VCD location and other details to all the applicable NCDs and HCDs including even the client devices that have not yet responded to initial EA Request message.

According to an aspect of the present disclosure, a client device may form a Preferred Group HCD (PGHCD) and register the list of the client devices in the PGHCD to the ESWS and the network element as the HCDs for that particular client device. The PGHCD may be formed, for example, for a group of family members, group of friends, group of coworkers, etc. According to an aspect of the present disclosure, when a VCD sends EA Request message to the network element, ESWS, or NCDs in SRWL, irrespective of the location of the PGHCD relative to the VCD, the network element and/or the ESWS may send alert notification to the PGHCD. According to an aspect of the present disclosure, the sending of EA Request message to the PGHCD may be in addition to the EA Request message sent to the nearby client devices on the network using broadcast/multicast and over the SRWL.

According to an aspect of the present disclosure, a VCD may send to the network element or ESWS an EA Request message specifying its preferences for getting assistance as follows. According to an aspect of the present disclosure, the preferences may include type of notification:
 i) Notification to PGHCD only
 ii) Notification to PGHCD and by general broadcast/multicast
 iii) Notification by general broadcast/multicast only
 iv) Notification to NCDs via SRWL only
 v) Notification using all of the above According to an aspect of the present disclosure, the above preferences may be pre-configured or may have default settings in the client device or may be chosen by the user at the time of initiating the EA Request message.

According to an aspect of the present disclosure, until the VCD user gets assistance or is out of danger or emergency, the network element and the ESWS may keep periodically sending the EA Request message to the NCDs, HCDs, and would be HCDs.

According to an aspect of the present disclosure, the EA Request message may be treated as a typical emergency call in terms of priority in the wireless network for granting access to the VCD.

According to an aspect of the present disclosure, when the VCD user is out of danger or emergency, the VCD may notify the network element, the ESWS and NCDs on SRWL that it is out of danger or emergency by sending an EA Stop message. According to an aspect of the present disclosure, the network element and ESWS may notify all the NCDs and HCDs that the VCD is out of danger or emergency by sending the EA Stop message for that particular VCD. Note that there may be multiple simultaneous EA procedures ongoing from the network element and ESWS perspective. According to an aspect of the present disclosure, the EA Stop message may be sent by either the VCD or by one of the HCD or NCD users who provided assistance to the VCD user. According to an aspect of the present disclosure, if an HCD is sending the EA Stop message, then the authenticity of the HCD may be checked by the network element and the ESWS. According to an aspect of the present disclosure, the network element and the ESWS may send EA Closure notification to VCD and request for confirmation.

According to an aspect of the present disclosure, in the case of SWRL, the VCD may keep scanning for available NCDs and keep broadcasting or multicasting or sending peer-to-peer EA request message to the NCDs until the VCD user stops the alert. This may help in the case when the VCD is in either security or health related EA situation and yet it may be mobile. The mobility of the VCD may be voluntary or may be forced, e.g., in a kidnapping situation. Another application of this aspect may be when a VCD is snatched from the original user by a thief. The original user (and the victim) may loudly utter a pre-stored voice command (e.g., "phone thief") to activate the EA request to EADs. This may help to quickly track down and catch the thief. Another application of this aspect may be in cases when a user is not the actual victim but a witness to an emergency situation. The user may initiate EA procedure to EADs with the camera facing the nearby victim or the crime scene.

Figure 8:
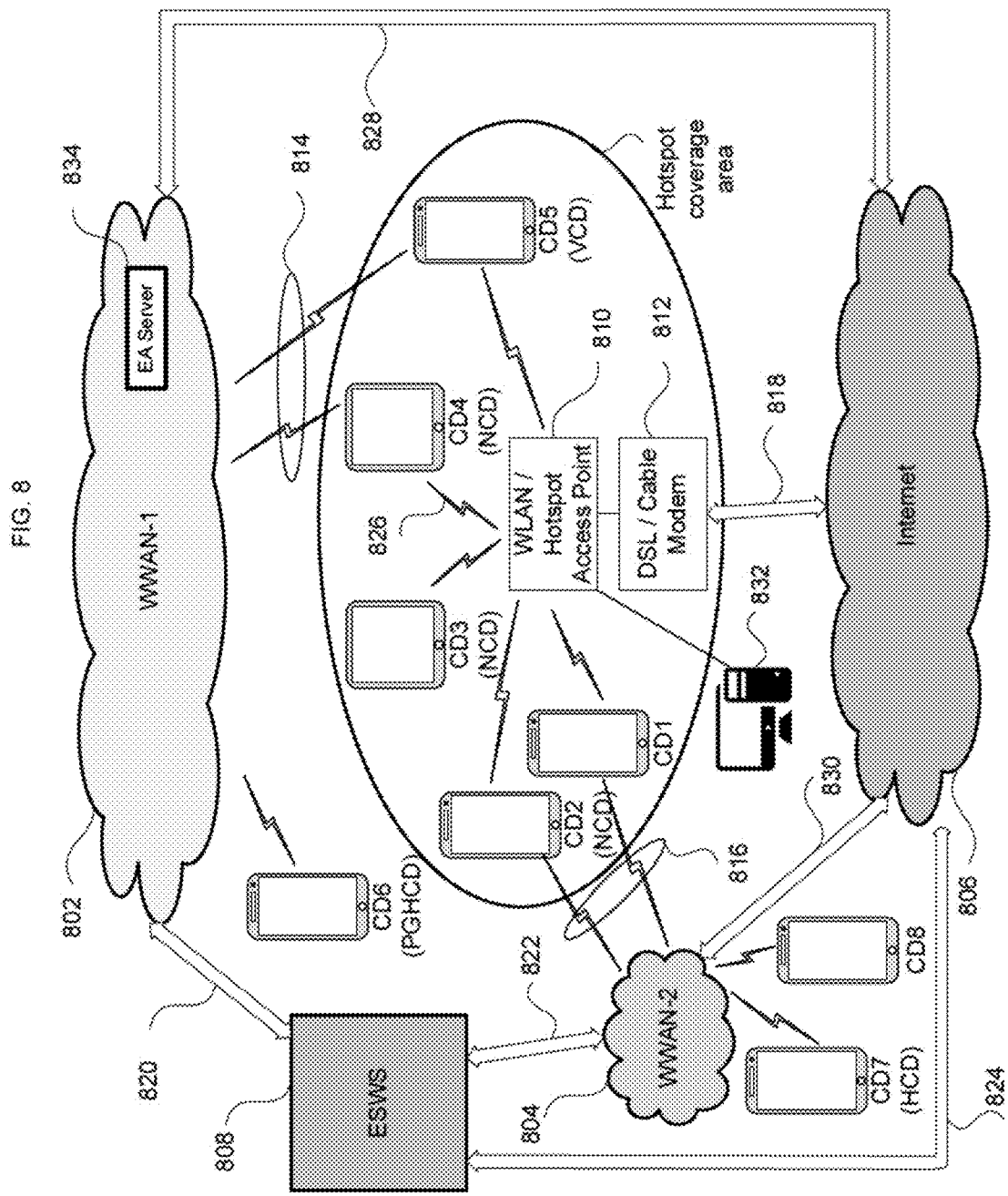
FIG. 8 illustrates a network Emergency Alert (EA) Server and a general Emergency Services Web Server (ESWS) operating in conjunction with multiple Wireless Wide Area Networks (WWANs), WLAN AP, and multiple client devices according to the aspects of the present disclosure to provide assistance to a user of a Victim Client Device (VCD).

FIG. 8 shows an example deployment of ESWS along with EA Server of the WWAN and a number of client devices camped on two different WWANs and an SRWL. Specifically, the WLAN/Hotspot Access Point (AP) 810 provides the SRWL to client devices in the Hotspot coverage area which includes client devices CD1 to CD5 which connect with the WLAN/Hotspot AP 810 over the Wi-Fi air-interface 826. In addition there is a desktop computer 832 getting internet service using wired connection such as Ethernet with the WLAN/Hotspot AP 810. The WLAN/Hotspot AP 810 is in turn connected to the DSL/Cable Modem 812 which provides connectivity to internet 806 over the interface 818. The client devices CD4 and CD5 are also connected to the WWAN-1 802 over the air-interface 814. The WWAN-1 802 may include its own EA Server 834. The client device CD3 does not have a connection to any WWANs. The client devices CD1 and CD2 are connected to the WWAN-2 804 over the air-interface 816. Both the WWAN-1 802 and WWAN-2 804 are connected to internet 806 over the interfaces 828 and 830 respectively. Both the WWAN-1 802 and WWAN-2 804 are also connected to the ESWS 808 over the interfaces 820 and 822 respectively. The ESWS 808 is also connected to the internet 806 over the interface 824. Client device CD6 may be connected to WWAN-1 802 alone and similarly client devices CD7 and CD8 may be connected to WWAN-2 804 alone.

Users of any one of the client devices shown in FIG. 8 may need assistance and may initiate the EA procedure by using an EA trigger to send EA Request message to the EA Server 834, ESWS 808, or to the client devices on the SRWL. In FIG. 8, the CD5 is illustrated to be a VCD which sends the EA Request message. The client devices CD2, CD3 and CD4 are illustrated to be NCDs which respond to the EA Request message from the CD5 VCD. The client device CD4 may have responded to the NEAB message from the EA Server 834 of WWAN-1 802 through one of its base stations. The CD2 and CD3 may have become NCDs by responding to the EA Request message sent by the VCD CD5 on the SRWL. Client device CD6 may be part of the PGHCD and may have received a message from the ESWS 808 and/or from the EA Server 834. Further, the client device CD7 may volunteer to be an HCD as a response to a message from the ESWS 808. Some client devices such as CD1, CD8, and desktop computer 832 may be either unable or unwilling to respond to the EA Request message.

FIG. 9 illustrates an example of an EA Request message using XML format. The XML format includes information fields in matching tags that are identified by the characters "<" and ">". The very first tag <?xml version="1.0"?> identifies the version number of the XML format being used in the rest of the file. In FIG. 9 the EA Request may be identified by a unique number using the opening tag <NEABNumber> with a value of "R0001" and is terminated by the matching closing tag <NEABNumber>. The information about the victim's name, age and gender may be included inside the opening tags <VCDName>, <VCDAGE>, and <VCDGender>. The tag <LocationInfo> may provide information about the client device's location using latitude and longitude. The tag <VCDAlertType> may be used to provide information about the type of emergency and in this example it is a health related. Nested tags may be used when there are different types of additional information for a certain type of information. For example, the tag <Vital> may provide information about the different measurements for different types of vitals. Specifically, the blood pressure measurement may be included under the <BP>, the heart rate under the tag <Pulse> and whether the past history of the vitals is available or not using the tag <History>. Additional tags for different types of vitals may be included under the tag <Vital>. The tag <VCDImage> may be used to provide one or more images (newly captured and/or pre-stored) by the VCD. Similarly, the tag <VCDVideo> may be used to provide one or more videos (newly captured and/or pre-stored) by the VCD. The tag <VCDAudio> may be used to provide one or more audio information captured by the VCD.

FIG. 10 illustrates an example of an NEAB message using XML format. The XML format of the NEAB message is very similar to the EA Request message from a VCD. The network element may or may not include additional information about the VCD.

The aspects of the present disclosure described above may be implemented in commercial client devices and commercial public and private networks. The aspects of the present disclosure may also be implemented in a dedicated public safety network, for example, FirstNet.

According to an aspect of the present disclosure, a client device may autonomously initiate EA procedure without explicitly receiving EA trigger from the user of the client device. An example use case of the autonomous trigger may include detection of abnormal health condition of the user of the client device to proactively seek assistance. Many handheld client devices, wearable devices such as smart watches or fitness trackers have vital signs monitors which may include hardware, software or combination of the two. Current and future client devices may have additional sensors based on nano-materials and other technology advances. These sensors in combination with machine learning algorithms may be able to detect or predict symptoms of diseases. Some of the possible health conditions that may be detected by the sensors and machine learning algorithms combination may include but not limited to drastic and/or sudden change in blood pressure, sugar/insulin level, heart rate, stress level, dehydration, peripheral capillary oxygen saturation (SpO2) level (an estimate of the amount of oxygen in the blood), breath odor, cancer, etc. According to an aspect of the present disclosure, the relevant health data may be provided by the user by entering the information through a user interface of the client device. In some cases the client device may be small in size with limited capability for displaying and inputting information, e.g., fitness trackers. In such cases the relevant health information may be provided over a link (e.g., Bluetooth, Wi-Fi, USB, etc.) with, for example, a personal computer which may offer a user interface for entering and viewing such information. According to an aspect of the present disclosure, the user may configure upper and lower bounds for triggering the autonomous EA procedure. For example, if the heart rate exceeds the configured bounds, the client device may initiate the autonomous EA procedure. According to an aspect of the present disclosure, the EAMU in the client device may be able to differentiate between the absence of receiving information from a sensor and a very large or a very small value from a sensor. According to an aspect of the present disclosure, the EAMU may trigger the autonomous EA procedure when combinations of two or more sensors indicate values outside the configured bounds. For example, when the sugar level and the heart rate exceed configured bounds.

According to an aspect of the present disclosure, the EAMU may monitor and record the measurements from one or more sensors of the client device. According to an aspect of the present disclosure, the EAMU may store the vitals and other measurements data in the ESWS even when the measurements are in nominal range. According to an aspect of the present disclosure, the EAMU and the ESWS may use blockchain technology to maintain the access to the health records private yet accessible to authorized personnel such as family members, guardians, caretakers, friends, emergency personnel, physicians, etc. According to an aspect of the present disclosure, the ESWS may be configured to periodically analyze the reported vitals measurements including using machine learning algorithms, for example, using neural networks. According to an aspect of the present disclosure, the machine learning algorithms in the ESWS may output a set of metrics such as lowest, highest, mean, variance, etc. for the various observed vitals measurements. According to an aspect of the present disclosure, the machine learning algorithm in the ESWS may determine the thresholds for triggering the autonomous EA procedure and may send those thresholds to the client device to use it locally.

According to an aspect of the present disclosure, once the criteria for autonomous triggers are met, EAMU may activate recoding of audio, video, pictures, etc. and may start reporting the vitals measurement data and the audio visual data to the relevant groups. According to an aspect of the present disclosure, the group of people and entities receiving the information from the EAMU may be different for the autonomous EA trigger compared to the user initiated EA trigger. For example, in case of autonomous EA trigger, only the immediate family members may be informed whereas in case of user initiated EA trigger police and/or fire services centers and personnel may be informed.

According to an aspect of the present disclosure, the recording and/or reporting of the health vitals data measurements and audio visual information may be adapted depending on the current battery level of a client device in case of a battery-operated client device. For example, if the battery level is above 75% or more of the full capacity, frequent (e.g., once every 10 seconds) data may be collected and reported while less frequent (e.g., once every 1 minute) data may be collected and reported when the battery level may be low (e.g., 25% or less of the full battery capacity). Furthermore, the types of measurements may be limited when the battery level is low. For example, only video may not be captured and transmitted but audio, pictures, heart rate, and blood pressure, and sugar levels may be captured and transmitted.

According to an aspect of the present disclosure, another example for autonomous trigger may be detection of sudden change of acceleration which may occur when a user with the client device gets into an accident or falls. Such detection of sudden change in acceleration may be achieved by the use of accelerometers or three axes gyroscopes which may be commonly used in client devices.

Another use case for the autonomous trigger may be elderly care, child care, or patient care purposes. According to an aspect of the present disclosure, if there is any abnormal behavior detected compared to any trained and/or predetermined behavior pattern, the client device may initiate EA procedure. The nominal user behavior pattern may be preprogrammed or estimated empirically based on observations of various vitals measurements as well as other indicators such as location and movement of the user. Note that the conventional methods of using GPS or RF Identity (RFID) technology to create a virtual geographic boundary, and enabling software to trigger an action when a client device enters or leaves a particular area may also be employed as an autonomous EA trigger. According to an aspect of the present disclosure, lack of expected movements over a certain configurable period of time may be used as a means for autonomous EA trigger. According to an aspect of the present disclosure, the group of people and entities receiving the information from the EAMU may be partly or wholly different for the different types of autonomous EA trigger and also different compared to the people and entities receiving information in case of user initiated EA trigger.

By way of example only, the above-described method for EA procedure may be implemented in a client device such as CD5 (VCD) in FIG. 8.

Figure 11:
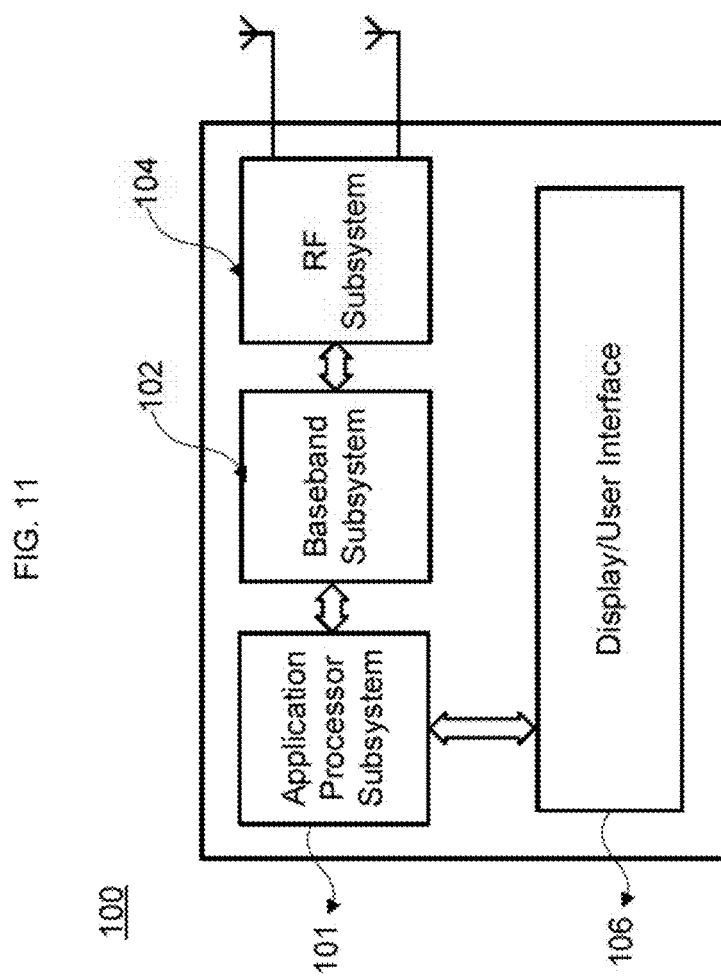
FIG. 11 illustrates a wireless mobile station diagram, which may be employed with aspects of the disclosure described herein.
Figure 12:
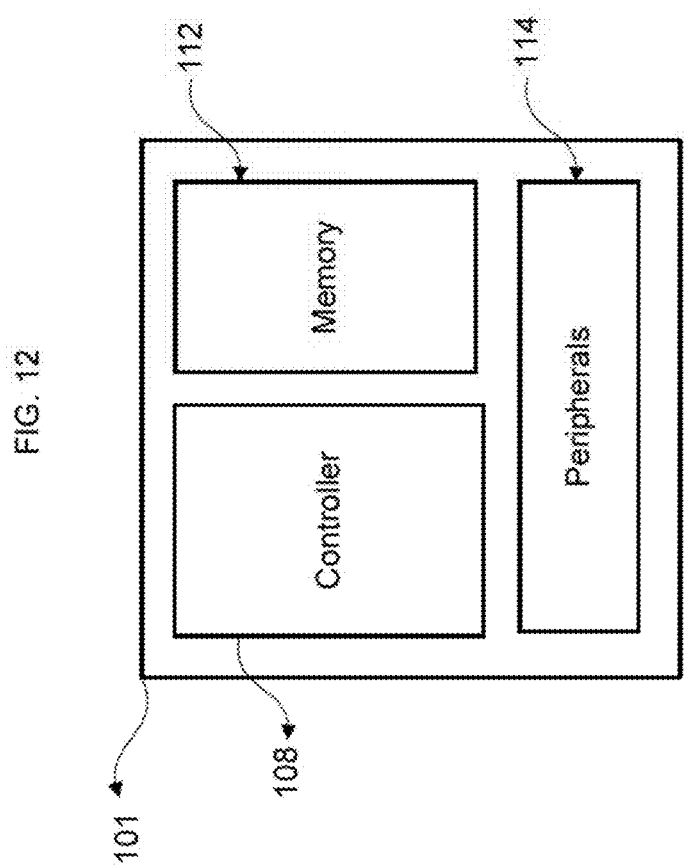
FIG. 12 illustrates an application processor subsystem for a wireless mobile station, which may be employed with aspects of the disclosure described herein.

As shown in FIG. 11, client device 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 may all be integrated as one integrated chip. The application processor subsystem 101 of FIG. 11 as detailed in FIG. 12 may include a controller 108 such as a microcontroller, another processor or other circuitry, memory 112 and peripherals 114. The controller 108 desirably handles overall operation of the client device 100. This may be done by any combination of hardware, software and firmware running on the controller 108. Such a combination of hardware, software and firmware may embody any methods in accordance with aspects of the present disclosure. In FIG. 12, the peripherals 114 such as a full or partial keyboard, video or still image display, audio interface, one or more SIM interfaces, etc. may be employed and managed through the controller 108.

Figure 13:
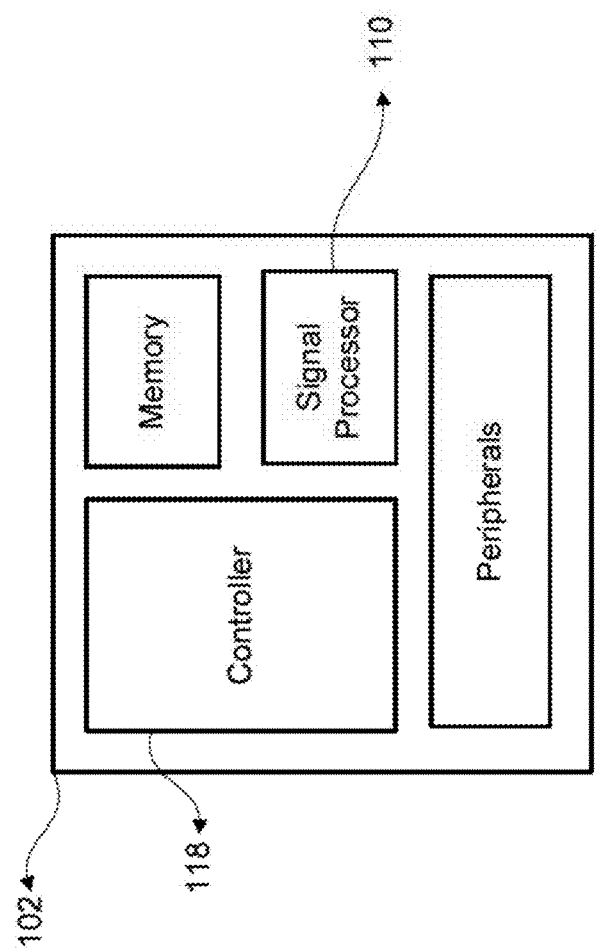
FIG. 13 illustrates a baseband subsystem for a wireless mobile station, which may be employed with aspects of the disclosure described herein.

The baseband subsystem 102 of FIG. 11 as detailed in FIG. 13 may include a controller 118 such as a microcontroller or other processor, a signal processor 110, memory, and peripherals. The EAMU inside a client device may implement the aspects of the present disclosure. Aspects of the present disclosure, which are part of the EAMU, may be implemented in firmware of the controller 108 of the application processor in FIG. 12 and/or the controller 118 of the baseband subsystem in FIG. 13. In another alternative, aspects of the present disclosure may also be implemented as a combination of firmware and hardware of the application processor subsystem 101 of FIG. 12 and/or the baseband subsystem 102 of FIG. 13. For instance, a signal processing entity of any or all of the FIG. 13 may be implemented in firmware, hardware and/or software. It may be part of the baseband subsystem, the receiver subsystem or be associated with both subsystems. In one example, the controller 118 and/or the signal processor 110 in FIG. 13 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Figure 14:
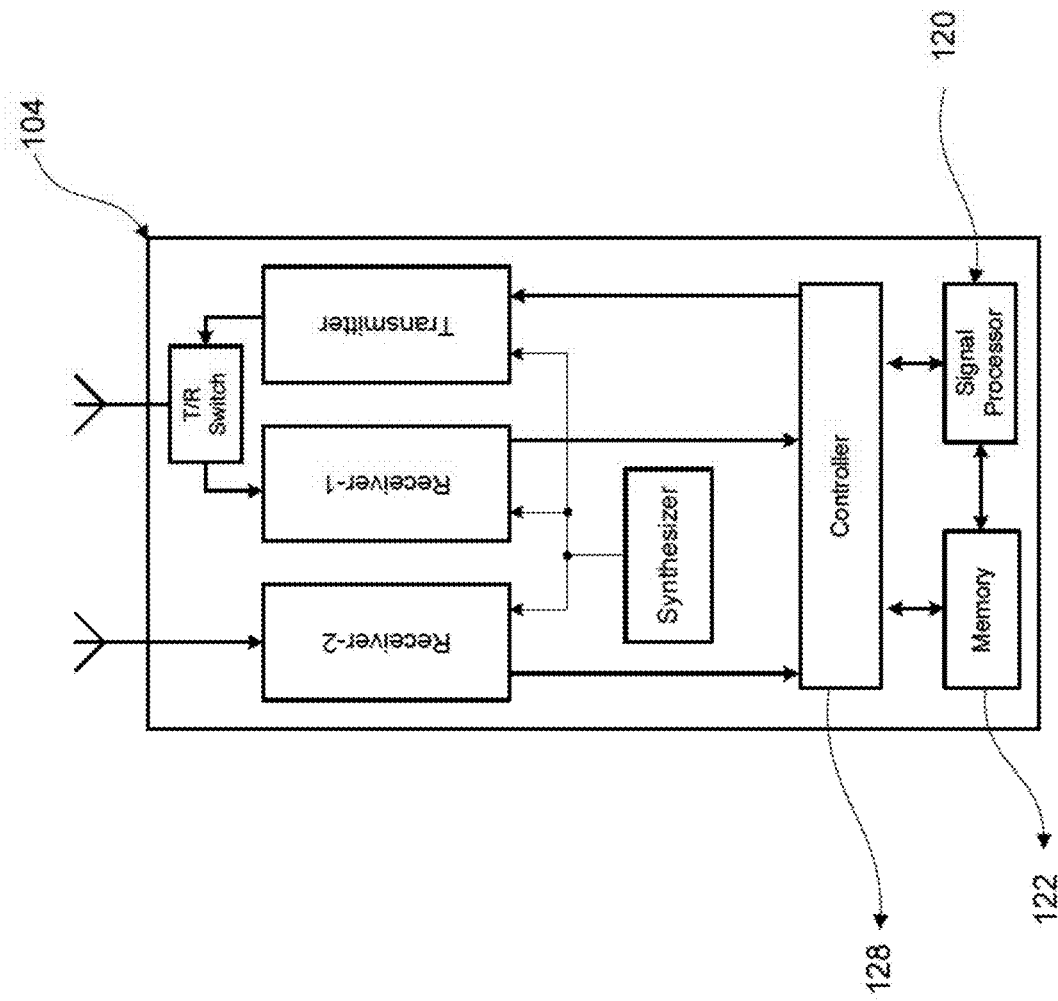
FIG. 14 illustrates a radio frequency (RF) subsystem for a wireless mobile station, which may be employed with aspects of the disclosure described herein.

The RF subsystem 104 of FIG. 11 as detailed in FIG. 14 may include a controller 128 such as a microcontroller, another processor or other circuitry. It may include memory 122 and a signal processor 120.

The consumer electronics devices that may use this disclosure may include smartphones, tablets, laptops, gaming consoles, cameras, video camcorders, car entertainment systems, etc.

Figure 15:
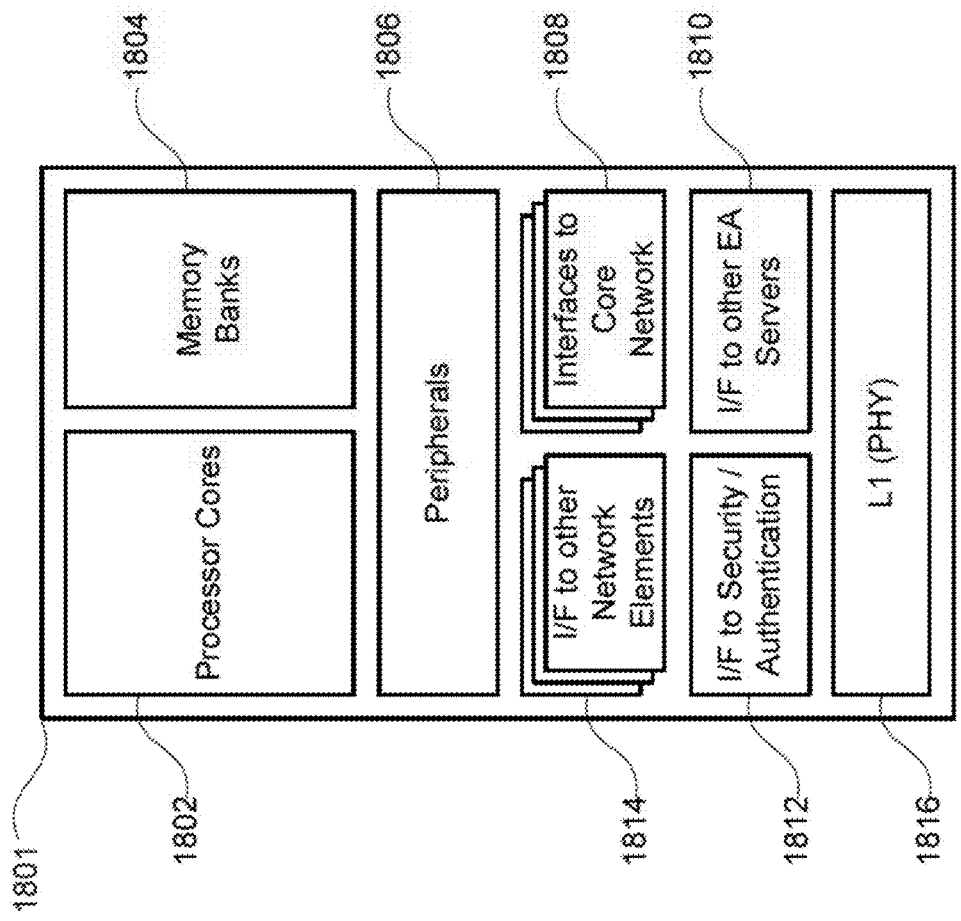
FIG. 15 illustrates a block diagram for a network EA Server which may be employed with aspects of the disclosure described herein.

By way of example only, aspects of the above-described EA procedure may be implemented in the EA Server 834 in FIG. 8. The EA Server of a network may provide connectivity from client devices to other client devices and emergency services resources by being the point of entry or exit of EA procedure related data packet traffic. The EA Server may have to implement functions beyond that may be required for EA procedures. For example, the EA Server may have to interface with a number of network elements such as base stations and outside the network such as emergency services resources. A block diagram of an example EA Server is illustrated in FIG. 15. As shown in FIG. 15, an EA Server 1501 may include one or more processor cores 1502, memory banks 1504, and peripherals 1506. In addition an EA Server may include one or more "Interfaces to other Network Elements" 1514 and one or more "Interfaces to Core Network" 1508. An EA Server may include "Interface to Security and Authentication" 1512 for communicating with corresponding processing entities of a network. An EA Server may include "Interface to other EA Servers" 1510 for communicating with other EA Servers to quickly and optimally disseminate information about the VCD to other EA Servers. While many of the functions of an EA Server may be implemented in software, some processing function may be implemented in hardware, e.g., the processing block L1 (PHY) 1516 may be a hardware block performing the layer 1 (physical layer) processing. Alternatively, some of the processing may be performed in a signal processor, an FPGA or an ASIC. Some of the hardware blocks may include the RF, antennas, and other analog components. Some of the interfaces of the EA Server may be wireless and some may be wire-line including optical fiber. Some of the wireless interfaces may use line-of-sight (LOS) microwave links.

Figure 16:
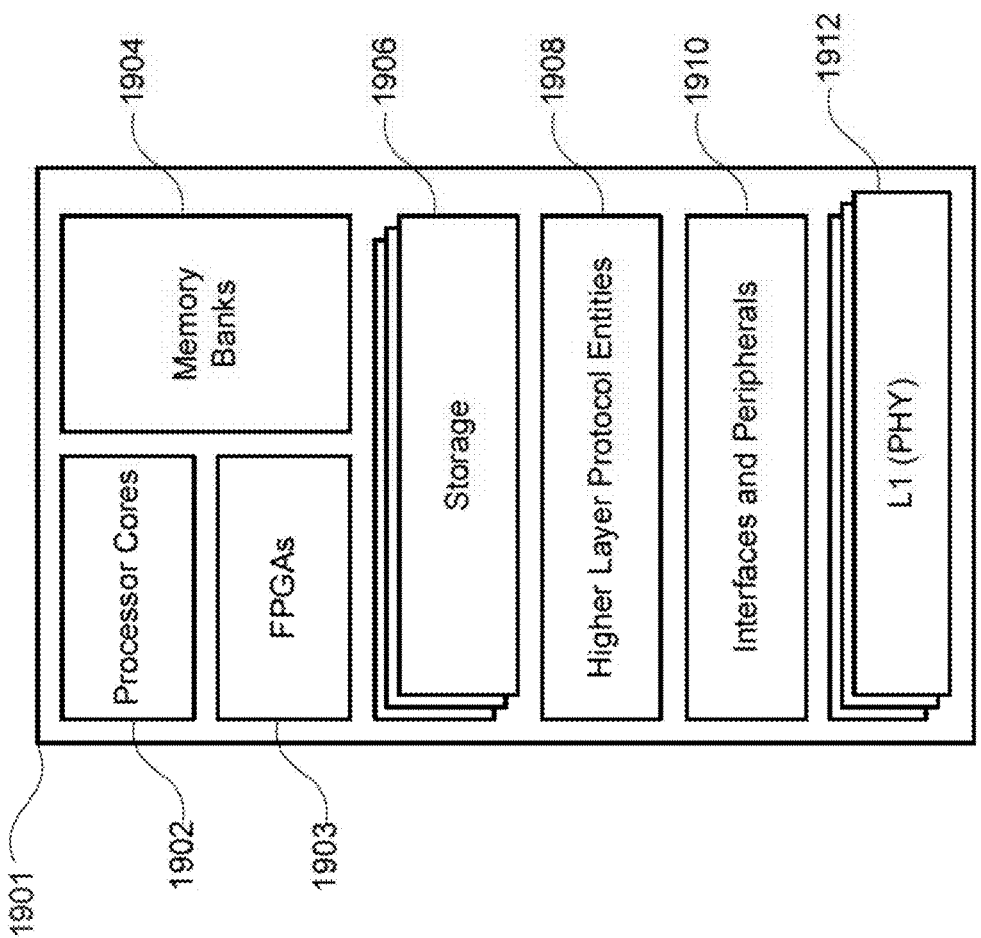
FIG. 16 illustrates a block diagram for ESWS which may be employed with aspects of the disclosure described herein.

By way of example only, the above-described method for EA procedure may implemented in a server such as ESWS 808 in FIG. 8. The web server may be a standard web server used for general purpose networking and computing. The processing blocks for the present disclosure may be implemented in software, hardware or combination of the two. A block diagram of a web server which may be used for ESWS is illustrated in FIG. 16. The web server 1601 may include one or more processor cores 1602, one or more FPGAs 1603, memory banks 1604, and storage elements 1606. The storage elements may be conventional hard disks or solid state hard disks and they may have redundancy and other robustness measures built against disk failures. The web server may also include the hardware and software for interfacing and communicating with the internet which include multiple Layer 1 (L1) or Physical layer (PHY) processing blocks 1612, Interfaces and Peripherals 1610 and the higher layer protocol entities 1608. The processing for EA procedure functionality may take place in the processor cores 1602 and/or the FPGAs 1603 both of which may use the memory banks 1604 for the temporary and long term storage. The EA Request message files may be located in the storage elements 1606 or may be located in the memory banks 1604 for faster access. The security and authentication related functions for EA procedure may be implemented as software, hardware or combination of the two using the processor cores and FPGA of the server.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in other embodiments described herein.

The invention claimed is:

1. A method for emergency alerting at an Emergency Alert Destination (EAD) as a network element of a wireless communication system, the method comprising:
   controlling, by a processing device at the EAD,
      receiving, from a Victim Client Device (VCD) of the wireless communication system, an Emergency Alert (EA) Request message including predetermined emergency information transmitted based upon initiation of an EA procedure at the VCD; and
      based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD, wherein the at least one second client device to which the NEAB message is transmitted is determined according to whether the EA procedure is triggered autonomously or by a user of the VCD.

2. The method of claim 1, further comprising:
   controlling, by the processing device, receiving, from the VCD, at least one of at least one image or at least one audio data associated with the EA procedure being performed at the VCD.

3. The method of claim 2, wherein the at least one image includes a plurality of images captured using a front and rear facing camera at the client device, or at least one second image from a memory of the VCD.

4. The method of claim 1, wherein the predetermined emergency information includes at least one of a measurement at the VCD from at least one available vitals monitor, a predetermined second prior taken vitals measurement or predetermined health information.

5. The method of claim 1, further comprising:
   controlling, by the processing device, determining the geographic proximity based on at least one of location of the VCD, location of a base station on which the VCD is camped or other predetermined criteria.

6. The method of claim 1, further comprising:
   controlling, by the processing device, transmitting the NEAB message to each base station having a same Tracking Area Identity (TAI) as a TAI of a given base station on which the VCD is camped.

7. The method of claim 6, further comprising:
controlling, by the processing device, requesting the each base station having the same TAI to broadcast the NEAB message in a respective coverage area.

8. The method of claim 1, further comprising:
controlling, by the processing device, determining a periodicity for the transmitting of the NEAB message and transmitting periodicity information indicating the periodicity with the NEAB message.

9. The method of claim 1, further comprising:
controlling, by the processing device, when the EAD is a base station,
receiving, from a second EAD of the wireless communication system, a second NEAB message with periodicity information indicating periodicity of transmission of the second NEAB message, in which the second NEAB message includes at least one of location, identification information or predetermined other information of a second VCD indicated by the second NEAB message as transmitting a second EA Request message including predetermined emergency information received by the second EAD; and
based on the second NEAB message with the periodicity information, updating system information (SI) to indicate presence and periodicity of given second NEAB messages.

10. The method of claim 1, further comprising:
controlling, by the processing device, providing an option for a third client device to register with the EAD for receiving a given NEAB message therefrom.

11. The method of claim 10, further comprising:
controlling, by the processing device, transmitting a multicast paging message only to a given third client device registered with EAD to receive a given NEAB message from the EAD, to notify of broadcast of the given NEAB message.

12. The method of claim 1, wherein the NEAB message includes at least one of an image from the VCD or vitals information for a user of the VCD.

13. The method of claim 1, wherein the NEAB message has a predetermined format adapted for inclusion therein of additional different types of information.

14. The method of claim 1, further comprising:
controlling, by the processing device, transmitting the NEAB message to a predetermined nearby emergency service resource.

15. The method of claim 14, wherein the predetermined nearby emergency service resource is registered with the EAD to receive a given NEAB message.

16. The method of claim 1, further comprising:
controlling, by the processing device, receiving a response message from the at least one second client device as a helping client device (HCD) or a nearby client device (NCD) indicating the at least one second client device volunteered to assist a user of the VCD.

17. The method of claim 1, further comprising:
controlling, by the processing device, transmitting an EA response message to the VCD notifying that the at least one second client device as a helping client device (HCD) or a nearby client device (NCD) volunteered to assist a user of the VCD.

18. The method of claim 1, further comprising:
controlling, by the processing device, prioritizing providing an updated location of the VCD, when the location of the VCD is changed, to a helping client device (HCD) or a nearby client device (NCD) of the VCD which volunteered to assist a user of the VCD.

19. The method of claim 1, further comprising:
controlling, by the processing device, transmitting a periodic update of a location and at least other emergency related information of the VCD to at least one of a helping client device (HCD) or a nearby client device (NCD) of the VCD which volunteered to assist a user of the VCD.

20. The method of claim 19,
wherein the periodic update is transmitted to the at least one of the HCD or the NCD when the at least one of the HCD or the NCD has not responded to a given EA Request message from the VCD.

21. The method of claim 1, further comprising:
when a Preferred Group helping client device (PGHCD) of given client devices each being a helping client device (HCD) for the VCD is registered with the EAD by the VCD, controlling, by the processing device, based on a second EA Request message transmitted from the VCD, transmitting an alert notification to the PGHCD.

22. The method of claim 21, wherein the second EA Request is other than the EA Request message, wherein the EA Request message is transmitted to a given nearby client device (NCD) of the VCD using broadcast or multicast and over a Short Range Wireless Link (SRWL).

23. The method of claim 1, further comprising:
controlling, by the processing device, receiving a given EA request message from the VCD specifying at least one notification preference including (i) notification only to a Preferred Group HCD (PGHCD) formed by the VCD and registered to the EAD, in which each given client device in the PGHCD is a given Helping Client Device (HCD) for the VCD, ii) notification to the PGHCD by general broadcast or multicast, iii) notification by general broadcast or multicast only, iv) notification only to at least one nearby client device (NCD) via a Short Range Wireless Link (SRWL) with which the at least one NCD is connected with the VCD, and v) notification by i), ii), iii) and iv).

24. The method of claim 1, further comprising:
controlling, by the processing device, until the VCD user gets assistance or is out of danger or emergency, periodically transmitting the EA Request message of the VCD to at least one of a nearby client device (NCD), a helping client device (HCD) or a potential HCD for the VCD.

25. The method of claim 1, further comprising:
when the EAD is a wireless network control element, controlling, by the processing device, treating the EA Request message as a predetermined emergency call for priority in the wireless communication system for granting network access to the VCD.

26. The method of claim 1, further comprising:
controlling, by the processing device, when a condition of out of danger or emergency exists at the VCD, receiving an EA Stop message from the VCD or from a given nearby client device (NCD) or a given helping client device (HCD) who provided assistance to a user of the VCD, to notify the EAD of the condition.

27. The method of claim 26, further comprising:
when the EA Stop message is received, controlling, by the processing device, notifying each given NCD and given HCD that the VCD is out of danger or emergency by transmitting the EA Stop message thereto.

28. The method of claim 26, further comprising:
when the EA Stop message is received and the EA Stop message is from the given HCD, controlling, by the processing device, checking authenticity of the given HCD.

29. The method of claim 26, further comprising:
when the EA Stop message is received, controlling, by the processing device, transmitting an EA closure notification to the VCD requesting confirmation of the EA Stop message.

30. The method of claim 1, wherein the EA request message is transmitted by at least one of broadcasting, multicasting or peer-to-peer.

31. An apparatus for emergency alerting at an Emergency Alert Destination (EAD) as a network element of a wireless communication system, the apparatus comprising:
circuitry configured to control,
receiving, from a Victim Client Device (VCD) of the wireless communication system, an Emergency Alert (EA) Request message including predetermined emergency information transmitted based upon initiation of an EA procedure at the VCD; and
based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD, wherein the at least one second client device to which the NEAB message is transmitted is determined according to whether the EA procedure is triggered autonomously or by a user of the VCD.

32. A wireless communication device comprising:
a receiver to receive a wireless communication; and
a processing device configured for emergency alerting at the wireless communication device as an Emergency Alert Destination (EAD) and which is a network element of a wireless communication system,
wherein the processing device is configured to control at the EAD:
receiving, from a Victim Client Device (VCD) of the wireless communication system, an Emergency Alert (EA) Request message including predetermined emergency information transmitted based upon initiation of an EA procedure at the VCD; and
based on receipt of the EA Request message, generating a Neighbor Emergency Alert (EA) Broadcast (NEAB) message including at least one of location or identification information of the VCD, and transmitting the NEAB message to at least one second client device in geographic proximity to the VCD, wherein the at least one second client device to which the NEAB message is transmitted is determined according to whether the EA procedure is triggered autonomously or by a user of the VCD.

* * * * *